US008107936B2

(12) United States Patent
Bhogal et al.

(10) Patent No.: US 8,107,936 B2
(45) Date of Patent: Jan. 31, 2012

(54) CONNECTING A PHONE CALL TO A MOBILE TELECOMMUNICATION DEVICE BASED ON THE TIME OF DAY THAT THE COMMUNICATION IS INITIATED

(75) Inventors: Kulvir Singh Bhogal, Pflugerville, TX (US); Robert Ross Peterson, Austin, TX (US); Lisa Anne Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 739 days.

(21) Appl. No.: 12/112,559

(22) Filed: Apr. 30, 2008

(65) Prior Publication Data

US 2009/0275317 A1 Nov. 5, 2009

(51) Int. Cl.
*H04M 3/42* (2006.01)
(52) U.S. Cl. ........ 455/417; 455/406; 455/445; 455/408; 379/445
(58) Field of Classification Search .................. 379/114, 379/132, 357, 211, 444; 455/406, 445, 408, 455/409; 235/380; 704/E17
See application file for complete search history.

(56) References Cited

U.S. PATENT DOCUMENTS

| | | | |
|---|---|---|---|
| 6,105,131 A * | 8/2000 | Carroll | 713/155 |
| 6,205,553 B1 * | 3/2001 | Stoffel et al. | 726/7 |
| 7,164,759 B2 | 1/2007 | Lebowitz et al. | |
| 7,194,070 B2 | 3/2007 | Starbuck et al. | |
| 7,236,577 B2 | 6/2007 | Lection et al. | |
| 7,411,939 B1 * | 8/2008 | Lamb et al. | 370/352 |
| 2001/0002364 A1 | 5/2001 | Lahtinen | |
| 2003/0112948 A1 | 6/2003 | Brown et al. | |
| 2004/0001501 A1 * | 1/2004 | Delveaux et al. | 370/442 |
| 2004/0001579 A1 * | 1/2004 | Feinberg et al. | 379/156 |
| 2005/0060584 A1 * | 3/2005 | Ginter et al. | 713/201 |
| 2005/0097222 A1 | 5/2005 | Jiang et al. | |
| 2005/0163104 A1 | 7/2005 | Christensen et al. | |
| 2006/0140200 A1 * | 6/2006 | Black et al. | 370/401 |
| 2006/0210032 A1 | 9/2006 | Grech et al. | |
| 2007/0037561 A1 | 2/2007 | Bowen et al. | |
| 2007/0118892 A1 * | 5/2007 | Sastry et al. | 726/10 |
| 2007/0133776 A1 | 6/2007 | Jain et al. | |
| 2007/0276911 A1 * | 11/2007 | Bhumkar et al. | 709/206 |
| 2007/0286384 A1 | 12/2007 | Christensen et al. | |
| 2009/0141875 A1 * | 6/2009 | Demmitt et al. | 379/88.14 |
| 2009/0151007 A1 * | 6/2009 | Koster et al. | 726/30 |

OTHER PUBLICATIONS

R. Karunamuthy et al. "A Business Model for Dynamic Composition of Telecommunication Web Services" IEEE Communications Magazine, Jul. 2007, pp. 36-43.

* cited by examiner

*Primary Examiner* — Nick Corsaro
*Assistant Examiner* — Mahendra Patel
(74) *Attorney, Agent, or Firm* — Yudell Isidore Ng Russell PLLC

(57) ABSTRACT

A method, system, and computer-readable medium with executable code for connecting an outgoing phone call to a user destination device based on the time the phone call is initiated. A user of a user destination device transmits a policy information packet containing contact numbers of a primary user destination device and all secondary user destination devices that the user may be reached at during specific times of the day to a call originating device. In response to the user of a call originating device initiating a request to connect a phone call to the user destination device, the call originating device autonomously selects the correct recipient user destination device by interpreting the policy information packet. The call originating device then connects the phone call to the primary user destination device or to a secondary user destination device depending on the current time of day.

9 Claims, 3 Drawing Sheets

US 8,107,936 B2

CONNECTING A PHONE CALL TO A MOBILE TELECOMMUNICATION DEVICE BASED ON THE TIME OF DAY THAT THE COMMUNICATION IS INITIATED

BACKGROUND OF THE INVENTION

1. Technical Field

The present invention relates in general to telecommunications, and in particular to mobile telecommunication devices. Still more particularly, the present invention relates to connecting a phone call to a host telecommunication device based on the time of day that the communication is initiated.

2. Description of the Related Art

Mobile telecommunication devices, such as cellular (cell) phones, have become a ubiquitous aid in allowing a person to be constantly accessible. While most cell phone users appreciate the convenience of being able to originate a communication (e.g., a phone call) at any time, there are times when a user of a mobile telecommunication device may not desire, or be available, to take an incoming call at a primary telecommunication device (e.g. the user has left the office for the day).

SUMMARY OF THE INVENTION

A method, system, and computer-readable medium with executable code for connecting an outgoing phone call to a user destination device based on the time the phone call is initiated. A user of a user destination device transmits a policy information packet containing contact numbers of a primary user destination device and all secondary user destination devices that the user may be reached at during specific times of the day to a call originating device. In response to the user of a call originating device initiating a request to connect a phone call to the user destination device, the call originating device autonomously selects the correct recipient user destination device by interpreting the policy information packet. The call originating device then connects the phone call to the primary user destination device or to a secondary user destination device depending on the current time of day.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer-readable medium with executable code for connecting an outgoing phone call to a user destination device based on the time the phone call is initiated, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
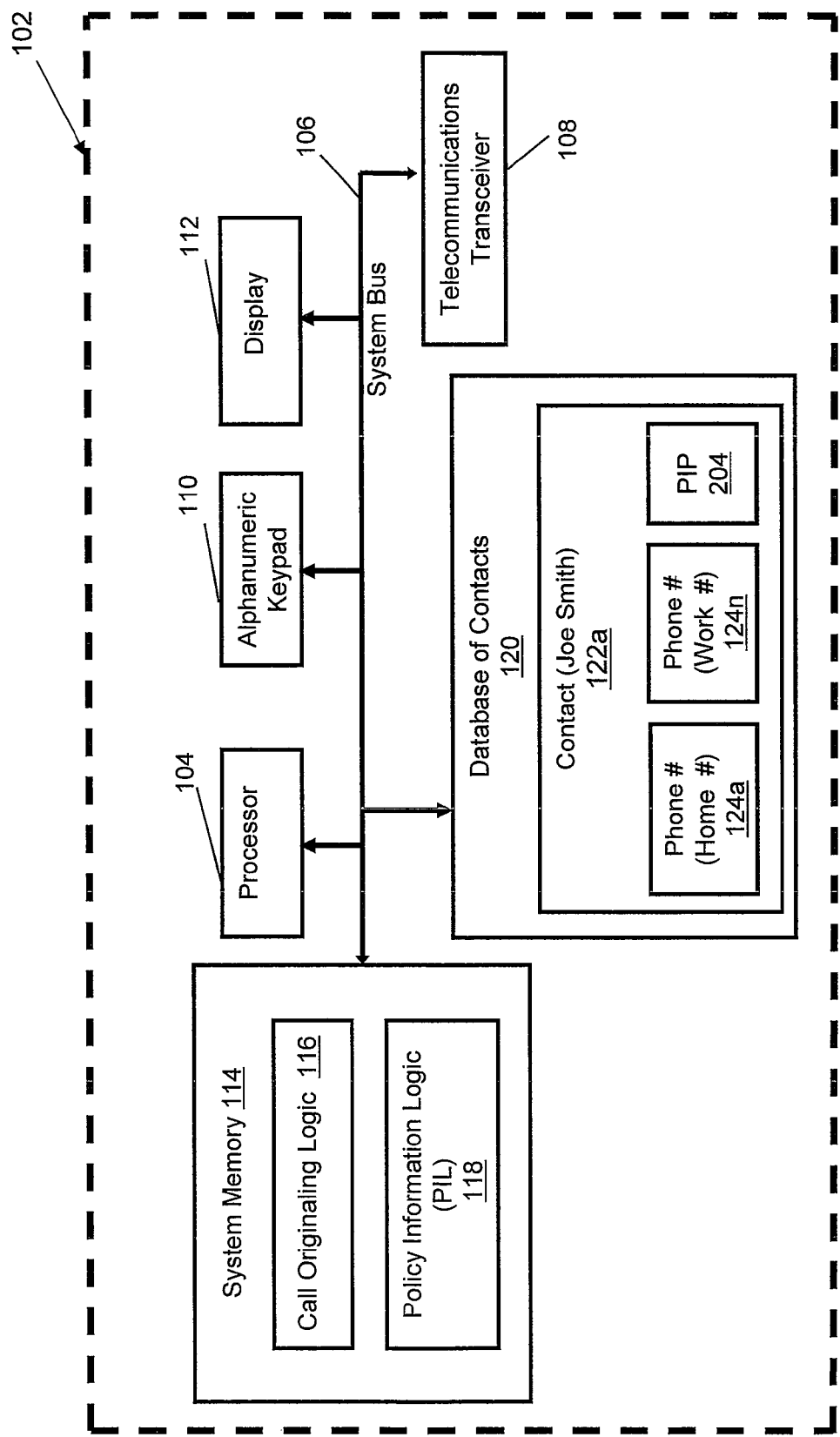
FIG. 1 is a block diagram of a receiving telecommunication device in which the present invention may be implemented.

With reference now to FIG. 1, there is depicted a block diagram of an exemplary Call Origin Device (COD) 102 in which the present invention may be implemented. COD 102 includes a processor 104 that is coupled to a system bus 106. A telecommunications transceiver 108, which uses a wireless technology to connect to other telecommunication devices, is also coupled to system bus 106. An alphanumeric keypad 110 is also connected to system bus 106 and permits data entry by a user of COD 102. Display 112, coupled to system bus 106, allows for presentation of text and graphics to a user of COD 102.

System memory 114 is connected to system bus 106. System memory 114 contains a call originating logic, which serves to manually or autonomously allow control of telecommunications transceiver 108 to permit communication with other similarly configured telecommunication devices. System memory 114 of COD 102 also includes a Policy Information Logic (PIL) 118. PIL 118 includes code for implementing the processes described in FIG. 2-3. In one embodiment, COD 102 is able to utilize PIL 118 to modify entries in database of contacts 120 and control operations of call originating logic 116, as described in greater detail below in FIG. 2-3.

Database of contacts 120 includes a list of contact numbers for contacts known to COD 102. Each contact listing may contain contact numbers for multiple telecommunication devices. Additionally, a Policy Information Packet (PIP) 204 may provide specific information pertaining to phone numbers that a specific contact of the database of contacts 120 may be reached at during specific times of day. PIP 204 may interface directly with individual contact 122 listings, and may also provide additional phone numbers 124*a-n* for a contact 122. Each contact 122 of the database of contacts 120 contains one or more phone numbers 124*a-n* of a contact 122.

The hardware elements depicted in COD 102 are not intended to be exhaustive, but rather are representative to highlight components required by the present invention.

Note also the architecture shown in FIG. 1 for COD 102 may be substantially implemented in User Destination Device (UDD) 202*a-n* shown below in FIG. 2.

Figure 2:
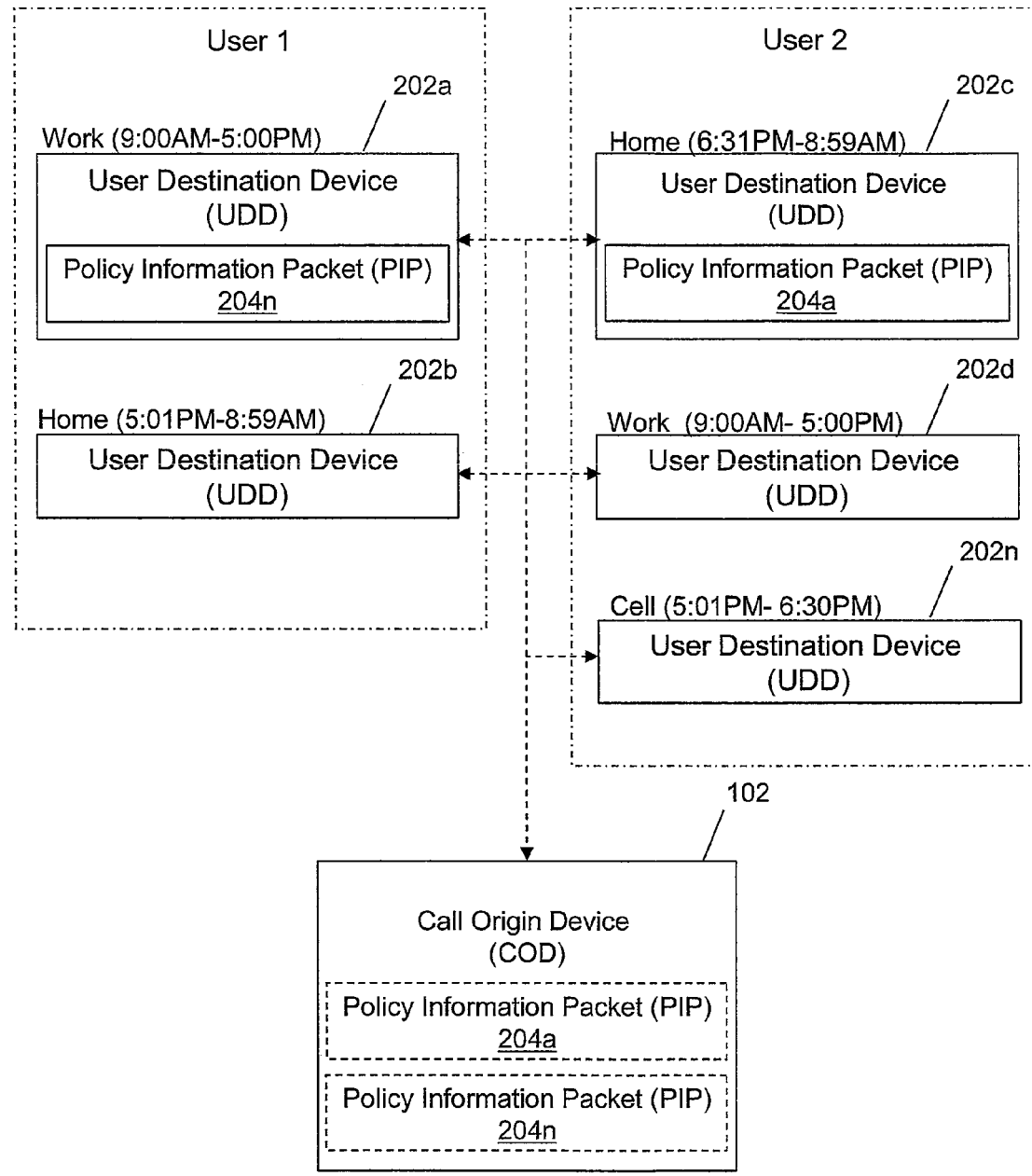
FIG. 2 is a block diagram of an exemplary system for autonomously selecting a host telecommunication device as the recipient of a phone call based on the time of day that the phone call is placed.

With reference now to FIG. 2, a block diagram is presented of an exemplary system for autonomously selecting a User Destination Device (UDD) 202*a-n*, where n is an integer greater than 1, as the recipient of a phone call, based on the time of day that the phone call is initiated. A UDD 202*a-n*

(e.g., a cell phone, a Plain Old Telephone System (POTS) land line, a cell-capable Personal Assistant Device (PDA), etc.) transmits a Policy Information Packet (PIP) 204 to a Call Originating Device (COD) 102. When a person utilizing COD 102 initiates a call request, a logic internal to COD 102 (e.g., PIL 118) autonomously selects a UDD 202a-n to PIP 204a-n is a data packet transmitted by UDD 202a-n which contains contact information and contact phone numbers for two or more UDDs 202a-n of a contact known to COD 102. PIP 204a-n may interface with one or more caller contact entries of a database of contacts of COD 102. PIP 204a-n may be a Short Message Service (SMS) message, an Extensible Markup Language (XML) packet, etc. This contact information may include phone numbers that the user of UDD 202a-n may be reached at during specific times of day. PIP 204a-n may also include personal information of the user of the associated UDDs 202a-n (e.g., first name, last name, birth date, etc). Alternatively, PIP 204a-n may be established at a server provider site linked to the account information of the primary UDD 202a-n, and may be transmitted from the server provider site directly to a COD 102.

Additionally, PIP 204a-n may also include a digital certificate. This digital certificate is a secure electronic signature transmitted by UDD 202a-n as a security measure. The digital certificate serves to prevent malicious spoofing by unverified telecommunication devices. A PIP 204a-n containing a digital certificate is transmitted by an UDD 202a-n. When COD 102 receives the PIP 204a-n the digital certificate is validated by logic internal to COD 102 (e.g., PIL 118). COD 102 will not transfer communication to a host telecommunication device until the digital certificate received from that UDD 202a-n has been verified.

For exemplary purposes, UDD 202a transmits PIP 202a to COD 102a. In this example, PIP 202a provides instructions for COD 102 to connect an outgoing phone call to be directed to a work mobile telecommunication device, UDD 202a, between 9:00 AM and 5:00 PM, and to a home telecommunication device, UDD 202n, between 5:01 PM and 8:59 AM. At 7:38 PM the user of COD 102a initiates a call with UDD 202a. PIL 118 determines the current time to be 7:38 PM. PIL 118 then checks PIP 202a to determine the correct call recipient. Following this, COD 102 autonomously connects the call to the UDD 202n, selected by PIL 118.

It is important to note that UDD 202a-n may transmit PIPs 204a-n to one or more CODs 102. Furthermore, PIPs 202a-n transmitted by a same UDD 202 may contain different contact information, and phone numbers that the user of UDD 202 may be reached at during specific times of day. That is, a PIP 204a transmitted by UDD 202a to a first COD 102a (e.g., a co-worker) may contain different call information than a PIP 204a transmitted to a second COD 102b (e.g., a family member).

Figure 3:
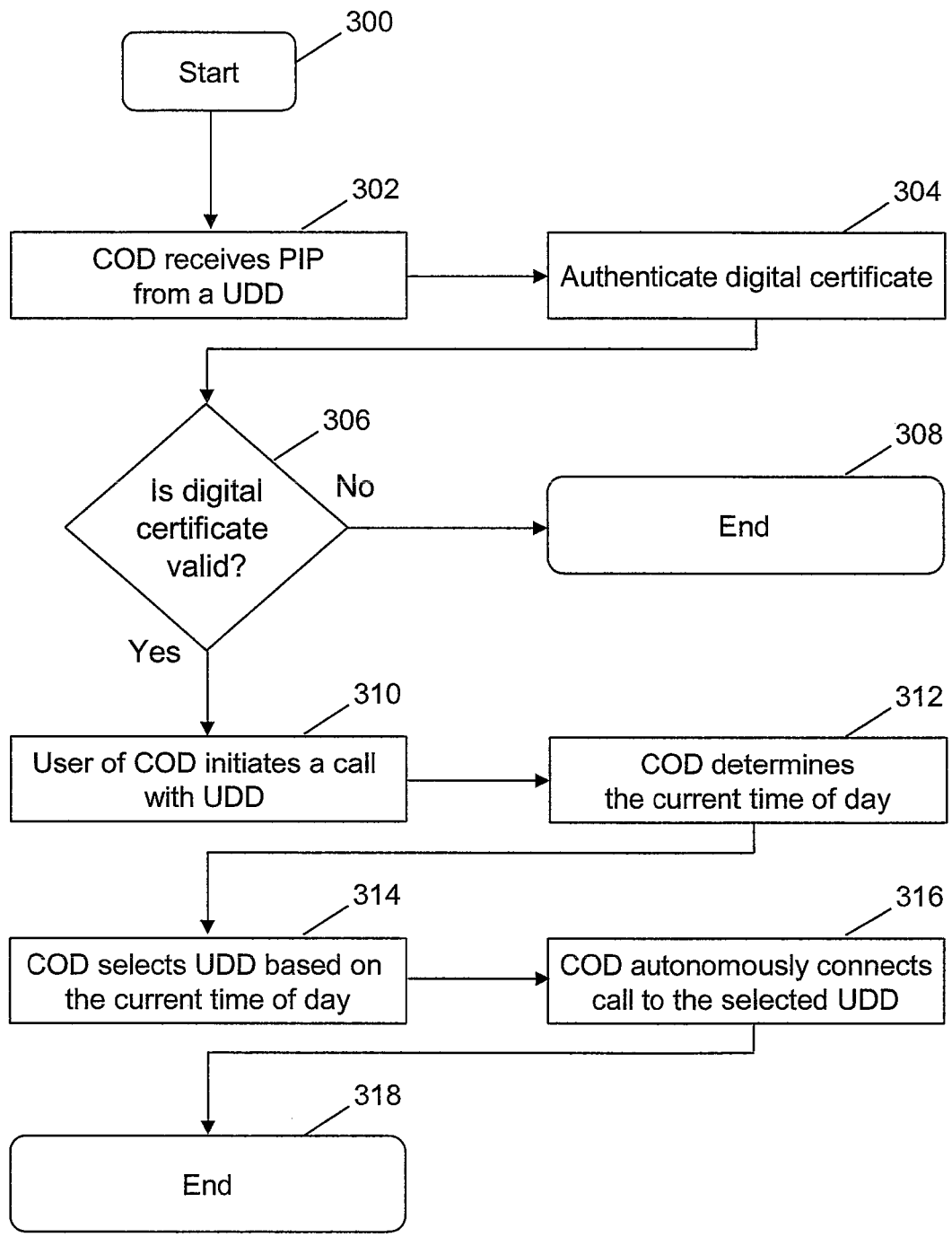
FIG. 3 is a high-level logical flowchart of an exemplary method for autonomously selecting among multiple host telecommunication devices as the recipient of a phone call based on the time of day that the phone call is placed.

With reference now to FIG. 3, a high-level logical flowchart of an exemplary method for autonomously selecting a User Destination Device (UDD) as the recipient of a phone call based on the time of day that the phone call is placed. After initiator block 300, Call Originating Device (COD) receives a Policy Information Packet (PIP) from a UDD. The PIP contains a digital certificate of the sending UDD, and phone numbers and a preferred contact time intervals of the sending UDD and one or more alternate UDDs (block 302). Upon receiving the PIP, COD attempts to authenticate the digital certificate (block 304). If the digital certificate is not valid (block 306), the process terminates (block 308).

When COD determines the digital certificate to be valid (block 306), COD may autonomously select a recipient UDD for receiving a phone call, when a phone call is initiated by a user of COD (block 310). After a phone call is initiated, COD determines the current time of day by reading a time clock internal to COD (block 312). Once the current time has been determined, COD selects a UDD from the list of UDDs in the PIP as the recipient of the phone call based on matching the current time with a contact time interval of an UDD listed in the PIP (block 314). COD then connects the phone call to the selected UDD (block 316). The process then ends at terminator block 318.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of autonomously connecting a phone call to a user destination device based on the time of day that the communication is initiated, the method comprising:

receiving a policy information packet transmitted via a telecommunications transceiver of a first host telecommunication device, wherein the policy information packet includes:
a contact phone number of a first user destination device,
a contact phone number of a second user destination device,
a digital certificate,
a preferred contact time interval of the first user destination device, and
a preferred contact time interval of the second user destination device that is different from the preferred contact time interval of the first user destination device;

in response to receiving the digital certificate within the policy information packet, authenticating the digital certificate, wherein authenticating the digital signature comprises: determining that the digital signature is valid; and allowing the call origin device to autonomously select a recipient user destination device from among the first and the second user destination devices only when the digital signature is determined to be valid;

in response to authenticating the digital certificate, modify, with the policy information packet, an entry corresponding to the host telecommunication device in a database of contacts within the call origin device, which causes the call origin device to select, based on determination of a current time interval, one of the first user destination device and the second user destination device when a phone call is subsequently initiated by the call origin device to the first host telecommunication device; and in response to initiating a call request with the first host telecommunication device:

determining a time at which the call request is initiated; and in response to the call origin device initiating the call request with the first host telecommunication device within the preferred contact time interval of the first user destination device, autonomously connecting the call request to the first user destination device.

2. The method of claim 1, further comprising in response to the call origin device initiating the call request with the first host telecommunication device within the preferred contact time interval of the second user destination device, autonomously connecting the call request to the second user destination device.

3. A call origin device comprising:

a processor;

a memory coupled to the processor;

a telecommunications transceiver to connect and exchange information with host telecommunication devices; and processing logic that:

receives a policy information packet transmitted via a telecommunications transceiver of a first host telecommunication device, wherein the policy information packet includes:

a contact phone number of a first user destination device, a contact phone number of a second user destination device, a digital certificate, a first preferred contact time interval of the first user destination device, and a second preferred contact time interval of the second user destination device, wherein the second preferred contact time interval is different from the first preferred contact time interval;

in response to receiving the digital certificate within the policy information packet, authenticates the digital certificate, wherein the processing logic that authenticates the digital signature comprises logic that: determines that the digital signature is valid; and allows a call original device (COD) to autonomously select a recipient user destination device from among the first and the second user destination devices only when the digital signature is determined to be valid;

in response to authenticating the digital certificate, modify, with the policy information packet, an entry corresponding to the host telecommunication device in a database of contacts within the call origin device, which causes the call origin device to select, based on determination of a current time interval, one of the first user destination device and the second user destination device when a phone call is subsequently initiated by the call origin device to the first host telecommunication device;

initiates a call request with the first host telecommunication device; and in response to the call origin device initiating a call request with the first host telecommunication device within the preferred contact time interval of the first user destination device, autonomously connects the call request to the first user destination device.

4. The call origin device of claim 3, the processing logic further comprising logic that, in response to the call origin device initiating a call request with the first host telecommunication device within the preferred contact time interval of the second user destination device, autonomously connects the call request to the second user destination device.

5. A non-transitory computer-readable storage medium having a plurality of instructions embodied therein, wherein the plurality of instructions, when executed by a processing device, allows a machine to:

receive a policy information packet transmitted using a telecommunications transceiver of a first host telecommunication device, wherein the policy information packet includes:

a contact phone number of the first user destination device, a contact phone number of a second user destination device, a digital certificate, a preferred contact time interval of the first user destination device, and a preferred contact time interval of the second user destination device that is different from the preferred contact time interval of the first user destination device;

in response to receiving the digital certificate within the policy information packet, authenticate the digital certificate;

in response to authenticating the digital certificate, modify, with the policy information packet, an entry corresponding to the host telecommunication device in a database of contacts within a call origin device (COD), which causes the call origin device to select, based on determination of a current time interval, one of the first user destination device and the second user destination device when a phone call is subsequently initiated by the call origin device to the first host telecommunication device;

initiate a call request with the first host telecommunication device; and in response to a call origin device initiating a call request with the first user destination device, wherein the call request is initiated within the preferred contact time interval of the first user destination device, autonomously connect the call request to the first user destination device.

6. The non-transitory computer-readable storage medium of claim 5, wherein the plurality of instructions further comprises instructions that in response to the call origin device initiating a call request with the first host telecommunication device within the preferred contact time interval of the second user destination device, cause the machine to autonomously connect the call request to the second user destination device.

7. The non-transitory computer readable storage medium of claim 5, further comprising instructions for:

establishing the policy information packet at a service provider site;

linking the policy information packet to account information of the primary user destination device; and transmitting the policy information packet from the server provider site directly to the call origin device.

8. The non-transitory computer readable storage medium of claim 5, wherein authenticating the digital signature comprises:
   determining that the digital signature is valid; and
   allowing the COD to autonomously select a recipient user destination device from among the first and the second user destination devices only when the digital signature is determined to be valid.

9. The method of claim 1, wherein the receiving the policy information packet transmitted from via a telecommunications transceiver of a first host telecommunication device comprises receiving the policy information packet via a service provider site, which establishes the policy information packet at the service provider site, links the policy information packet to account information of the primary user destination device, and transmits the policy information packet from the server provider site directly to the call origin device.

* * * * *